(12) United States Patent
Rudolph et al.

(10) Patent No.: US 10,114,223 B2
(45) Date of Patent: Oct. 30, 2018

(54) IMAGING DEVICE AND DATA EYEGLASSES

(71) Applicant: Carl Zeiss Smart Optics GmbH, Aalen (DE)

(72) Inventors: Guenter Rudolph, Jena (DE); Momchil Davidkov, Aalen (DE); Toufic Jabbour, Aalen (DE)

(73) Assignee: tooz technologies GmbH, Aalen (DE)

( * ) Notice: Subject to any disclaimer, the term of this patent is extended or adjusted under 35 U.S.C. 154(b) by 0 days.

(21) Appl. No.: 15/500,514

(22) PCT Filed: Jul. 29, 2015

(86) PCT No.: PCT/EP2015/067392
§ 371 (c)(1),
(2) Date: Jan. 30, 2017

(87) PCT Pub. No.: WO2016/016311
PCT Pub. Date: Feb. 4, 2016

(65) Prior Publication Data
US 2017/0219832 A1 Aug. 3, 2017

(30) Foreign Application Priority Data
Aug. 1, 2014 (DE) .................. 10 2014 110 961

(51) Int. Cl.
*G02B 27/01* (2006.01)

(52) U.S. Cl.
CPC ......... *G02B 27/0179* (2013.01); *G02B 27/01* (2013.01); *G02B 27/0172* (2013.01);
(Continued)

(58) Field of Classification Search
CPC ................ G02B 27/0179; G02B 27/01; G02B 27/0172; G02B 27/0176; G02B 2027/0154; G02B 2027/0178; G02B 2027/0185
(Continued)

(56) References Cited

U.S. PATENT DOCUMENTS 5,886,822 A 3/1999 Spitzer
6,317,169 B1 * 11/2001 Smith ................... G02B 27/48
348/744
(Continued)

FOREIGN PATENT DOCUMENTS

| JP | 2012242721 A | 10/2012 |
| WO | 9815868 A1 | 4/1998 |
| WO | 2013052014 A1 | 4/2013 |

OTHER PUBLICATIONS

International Preliminary Report on Patentability rendered by the International Bureau of WIPO for PCT/EP2015/067392 dated Feb. 7, 2017, 11 pages.
(Continued)

*Primary Examiner* — William R Alexander
(74) *Attorney, Agent, or Firm* — Skaar Ulbrich Macari, P.A.

(57) ABSTRACT

An imaging device includes at least one eyeglass lens to be worn in front of the eye and a display device arranged in the edge region of the eyeglass lens, said display device including an image generator and an imaging optics arranged between the image generator and the eyeglass lens. The image generator is the start point of an imaging beam path which generates the virtual image having an image distance on the basis of the output image and which penetrates into the eyeglass lens by means of the imaging optics via the edge region of the eyeglass lens. An outcoupling device for outcoupling the imaging beam path in the direction of the eye is provided in the eyeglass lens. The display device comprises a device for adjusting the image distance of the virtual image. The invention also relates to data eyeglasses comprising an imaging device.

18 Claims, 4 Drawing Sheets

(52) U.S. Cl.
CPC .. *G02B 27/0176* (2013.01); *G02B 2027/0154* (2013.01); *G02B 2027/0178* (2013.01); *G02B 2027/0185* (2013.01)

(58) Field of Classification Search
USPC .......................................................... 359/630
See application file for complete search history.

(56) References Cited

U.S. PATENT DOCUMENTS

| | | | |
|---|---|---|---|
| 8,587,734 B2* | 11/2013 | Li | G02C 7/08 349/13 |
| 2005/0231599 A1 | 10/2005 | Yamasaki | |
| 2009/0153796 A1* | 6/2009 | Rabner | A61B 3/0091 351/201 |
| 2010/0103078 A1 | 4/2010 | Mukawa et al. | |
| 2012/0113092 A1 | 5/2012 | Bar-Zeev et al. | |
| 2012/0194781 A1 | 8/2012 | Agurok | |
| 2013/0070204 A1* | 3/2013 | Johansson | A61B 3/024 351/224 |
| 2013/0293468 A1 | 11/2013 | Perez et al. | |
| 2013/0314793 A1 | 11/2013 | Robbins et al. | |
| 2014/0085190 A1 | 3/2014 | Erinjippurath et al. | |
| 2014/0211148 A1* | 7/2014 | Crosby | G02C 7/028 351/159.7 |
| 2016/0011419 A1* | 1/2016 | Gao | G02B 27/0172 359/471 |

OTHER PUBLICATIONS

The International Search Report rendered by the International Searching Authority for PCT/EP2015/067392, dated Feb. 12, 2016, 16 pages.

* cited by examiner

IMAGING DEVICE AND DATA EYEGLASSES

PRIORITY

This application claims the benefit of German Patent Application No. 102014110961.9 filed on Aug. 1, 2014, which is hereby incorporated herein by reference in its entirety.

FIELD

The present invention relates to an imaging device for representing a virtual image having at least one eyeglass lens to be worn in front of the eye and data eyeglasses having such an imaging device.

BACKGROUND

Data eyeglasses are a special form of a head-mounted display. One popular form of head-mounted display uses screens that are worn in front of the eyes and presents the user with computer-generated images or images received by cameras. Such head-mounted displays are frequently voluminous and permit no direct perception of the surroundings. Just recently head-mounted displays were developed that can present the user with an image received by a camera or a computer-generated image without impeding direct perception of the surroundings. Such head-mounted displays, which shall hereinafter be referred to as data eyeglasses, permit the use of this technology in everyday life.

Typical data eyeglasses, as described for example in DE 10 2011 007 812 A1 and US 2012/0002294 A1, comprise an image generator to produce an image, and an eyeglass lens to which an imaging beam path proceeding from the image generator is incoupled. By means of an outcoupling region present in the eyeglass lens, the imaging beam path is outcoupled in the direction of the eye of the data eyeglasses wearer. In addition, an imaging optics is present, which causes the imaging beam path to generate a virtual image that can be perceived by the user. Here the outcoupling of the imaging beam path in the direction of the eye occurs by means of a beam-splitting outcoupling region in such a way that the virtual image is superimposed over the image of the surroundings, so that the user perceives the virtual image in addition to the surroundings.

U.S. Pat. No. 5,886,822 describes data eyeglasses with eyeglass lenses in which an imaging beam path can be incoupled to the edge. By means of an outcoupling element, the imaging beam path is outcoupled in the direction of the eye. Further, the data eyeglasses comprise a display and a cone that can be displaced relative to an input end of a gradient-index fiber arranged between the cone and the edge of the eyeglass lens.

US 2013/0314793 A1 describes data eyeglasses with a waveguide, which can be configured as an eyeglass lens, wherein an image generator is arranged on the edge of the waveguide, whose image is incoupled by means of an imaging optics via the edge of the waveguide into the latter. By means of an outcoupling device, the imaging beam path is outcoupled from the waveguide so as to generate a virtual image. Here the outcoupling device has various focusing elements that can optionally be switched on and off. Depending on which focusing element is switched on, the virtual image appears at a different image distance.

So as to be able to present the user of the data eyeglasses with a comfortable and ergonomic virtual image, the imaging optics has a large magnification (typical greater than 100) and is configured so that by means of the virtual image, the observer is given the impression that the scene represented in the virtual image is at a distance of a few meters in front of the eye.

The distance at which the virtual image is perceived by the observer, however, is very sensitive with respect to position and thickness tolerances of the optically effective surfaces. Factors that can influence this distance include manufacturing tolerances, ecological and weather influences based on various operating conditions (air temperature, relative humidity, volume change due to heating, for instance from solar radiation and the like). For this reason, there can be disturbing variations of the distance, in which the virtual image is perceived.

SUMMARY

In light of the described prior art, it is the object of the present invention to make available an advantageous image distance for representing a virtual image.

This object is achieved according to the invention by an image distance according to claim 1 or data eyeglasses according to claim 16. The dependent claims contain advantageous embodiments of the invention.

An image distance according to the invention for representing a virtual image comprises at least one eyeglass lens to be worn in front of the eye, which need not necessarily be made from glass, but also can be made from plastic. In addition, the eyeglass lens can also be configured for correcting defective vision if the user of the data eyeglasses provided with the imaging device has defective vision and/or for exercising a protective function, for instance by tinting or coating to reduce the intensity of the light reaching the eye and or of the UV radiation reaching the eye. In particular, data eyeglasses provided with the imaging device can thus be configured as sunglasses.

The imaging device according to the invention also comprises a display device arranged at the edge region of the eyeglass lens, which has an image generator (display) for displaying an output image as well as a preferably magnifying imaging optics arranged between the image generator and the eyeglass lens for producing a virtual image from the output image. Preferably liquid crystal displays (LCDs) or displays from organic light-emitting diodes (OLEDs) are used as the image generator. But also other display technologies such as digital mirror devices (DMDs for short) illuminated by mono- or polychromatic light sources can be used. The image generator is the start point of an imaging beam path producing the virtual image with an image distance from the output image, which imaging beam path undergoes incoupling into the eyeglass lens by means of the imaging optics via the edge region of the eyeglass lens. In the eyeglass lens, there is an outcoupling device for outcoupling the imaging beam path incoupled into the eyeglass lens in the direction of the eye. In the image distance, the display device comprises a device for adjusting the image distance of the virtual image. The edge region over which the incoupling of the imaging beam path into the eyeglass lens occurs can here be a region of the lateral edge surface of the eyeglass lens, a region of the front part of the eyeglass lens situated on the edge of the eyeglass lens, a region of the rear side of the eyeglass lens situated on the edge of the eyeglass lens, or a canted region at the edge of the eyeglass lens between the lateral edge surface and the front side or between the lateral edge surface and the rear side of the eyeglass lens.

Based on the capability of adjusting the image distance, data eyeglasses provided with the imaging device according to the invention can be optimally used under different operating/ambient conditions. The operator can adjust the image distance corresponding to the operating/ambient conditions in such a way that he always perceives the image at the same distance. But also with the same operating/ambient conditions, different users of data eyeglasses provided with the imaging device according to the invention can each adjust them in such a way that they perceive the most comfortable distance for them, so that the representation of the virtual image does justice to the respective individual preferences. With the possibility of adjusting the image distance, in addition a content-dependent adjustment for superimposed images can be created, for example for superposition of a turn-off arrow in a virtual image plane corresponding to the actual distance of the user from an intersection.

In a first variant of the imaging device according to the invention, as a device for adjusting the image distance, the display device has at least one actuator connected to the image generator to effect displacement of the image generator. A mechanical or electromechanical actor such as a piezoelectric actuator and in particular a piezotranslator, can be used as the actuator. Furthermore, the imaging device can in addition comprise a device for tipping of the image generator.

Using an actuator connected to the image generator, the position of the image generator can be varied with respect to the imaging optics. Since the image distance in a first approximation is proportional to the square of the magnification, for varying the image distance only a very small displacement of the image generator in the direction of the optical axis is necessary. Such a displacement be realized with a single actuator. On the other hand, if at least three actuators are present, which are arranged at the corners of a notional triangle and are each connected to the image generator, not only displacement of the image generator along the optical axis, but also tipping of the imaging plane of the image generator, is possible, so that the at least three actuators can serve as the device for tipping of the image generator. In this manner, there is possibility of varying not only the image distance of the virtual image, but also to equalize possible tolerances in orientation of the image generator. The notional triangle at whose corners the actuators are arranged can here in particular be an equilateral triangle, which simplifies control of the tipping. Since the image generator typically has a rectangular shape, as an alternative to the triangular arrangement of the actuators, it is also possible to arrange one actuator on each edge of the rectangular image generator. Also in this embodiment, in addition to displacement of the image generator along the optical axis, tipping of the image generator relative to the optical axis is also possible. If tipping only about a single axis needs to be implemented, the tipping device of the image generator can also be realized by two actuators.

In a second variant of the imaging device according to the invention, the display device, as a device for adjusting the image distance, has at least one wavefront manipulator arranged between the image generator and the edge of the eyeglass lens for manipulating the focal length of the imaging optics. Using the wavefront manipulator, the focal length of the imaging optics can be varied, and thus also the image distances of the virtual image, which depend on the focal length.

As wavefront manipulators, wavefront manipulators can be used that make it possible to influence the focal length of the imaging optics. Examples of such wavefront manipulators include among others adaptive mirrors and liquid lenses. Preferably, however, a wavefront manipulator is used that comprises a first optical component with at least one first freeform surface and at least one second optical component with at least one second freeform surface, the optical component and the second optical component being arranged along the optical axis of the imaging beam paths behind one another and movably arranged relative to one another in a direction of motion perpendicular to the optical axis. Such elements are known as Alvarez elements and are described in U.S. Pat. No. 3,305,294. Such a wavefront manipulator makes it possible to vary the focal length of the imaging optics wherein only a movement perpendicular to the optical axis of the imaging optics is necessary. Therefore no installation space need be reserved for a displacement or deforming of optical elements in the direction of the optical axis of the imaging optics. Thus the embodiment of the wavefront manipulator components having freeform surfaces permits designing the display device in the direction of the optical axis more compactly than when at least one actuator acting on the image generator is used. In addition, the image distance during displacement of the image generator in the direction of the optical axis reacts very sensitively to the position of the image generator, so that the actuator requires very precise control, which constitutes a not insignificant effort. However the use of three or four actuators, which provide the displacement in the direction of the optical axis of the imaging optics, forbid the additional possibility of tipping of the image generator, which when a wavefront manipulator is used, is again associated with a greater expenditure than when three or four actuators are used that operate in the direction of the optical axis.

When a wavefront manipulator having at least two optical components each having a freeform surface and displaceable toward the other is used, the freeform surfaces can be defined in a Cartesian coordinate system with an x-axis, a y-axis, and a z-axis, wherein the z-axis represents the optical axis of the imaging beam path and the z-coordinates of the freeform surfaces depending on the x- and y-coordinates are described by a polynomial expansion of the form:

$$z = \sum_{m,n=0}^{\infty} C_{m,n} x^m y^n$$

Here $C_{m,n}$ indicates the expansion coefficients of the polynomial expansion of the freeform surfaces in the degree m with respect to the x-coordinate and the degree n with respect to the y-coordinate. A variation of the image distance can hereby in particular already be achieved when for a y-axis running parallel to the direction of motion, only polynomials with odd degree n and even degree m have expansion coefficients different from zero. In this case, if the expansion coefficients of the polynomials $x^2 y$ and $y^3$ are different from zero, a defocus can be effected with the freeform surfaces and thus a variation of the focal length of the imaging optics. Further, if in addition at least the expansion coefficients of the polynomials $x^4 y$, $x^2 y^3$ and $y^5$ are different from zero, the third-order spherical aberration can also be corrected. Using further polynomials with odd order n and even order m, which have expansion coefficients different from zero, further image errors can be corrected.

The components with freeform surfaces require especially little installation space in the direction of the optical axis when the z-coordinates of the freeform surfaces deviate by no more than ±0.1 mm, preferably by more than ±50 µm, and in particular by no more than ±30 µm for median value of the z-coordinate. With such small deviations of the z-coordinates from a mean value, already an adequate variation in the image distance can be realized. So as to keep the installation space perpendicular to the optical axis from becoming too large, it is also advantageous if the values of the maximal displacement of the first optical component and the second optical component are each no more than 5 mm, preferably no more than 2.5 mm. Although essentially large displacement paths are not ruled out, these would enlarge the volume of the display device and reduce the manageability of display devices provided with the imaging device according to the invention.

Data eyeglasses according to the invention are fitted with an imaging device according to the invention. Properties and advantages of such data eyeglasses follow from the already-described properties and advantages of the imaging device, to which we therefore refer.

Further features, properties, and advantages of the present invention follow from the description below of exemplary embodiments with reference to the enclosed figures.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

In the following descriptions, the present invention will be explained with reference to various exemplary embodiments. Nevertheless, these embodiments are not intended to limit the present invention to any specific example, environment, application, or particular implementation described herein. Therefore, descriptions of these example embodiments are only provided for purpose of illustration rather than to limit the present invention.

Figure 1:
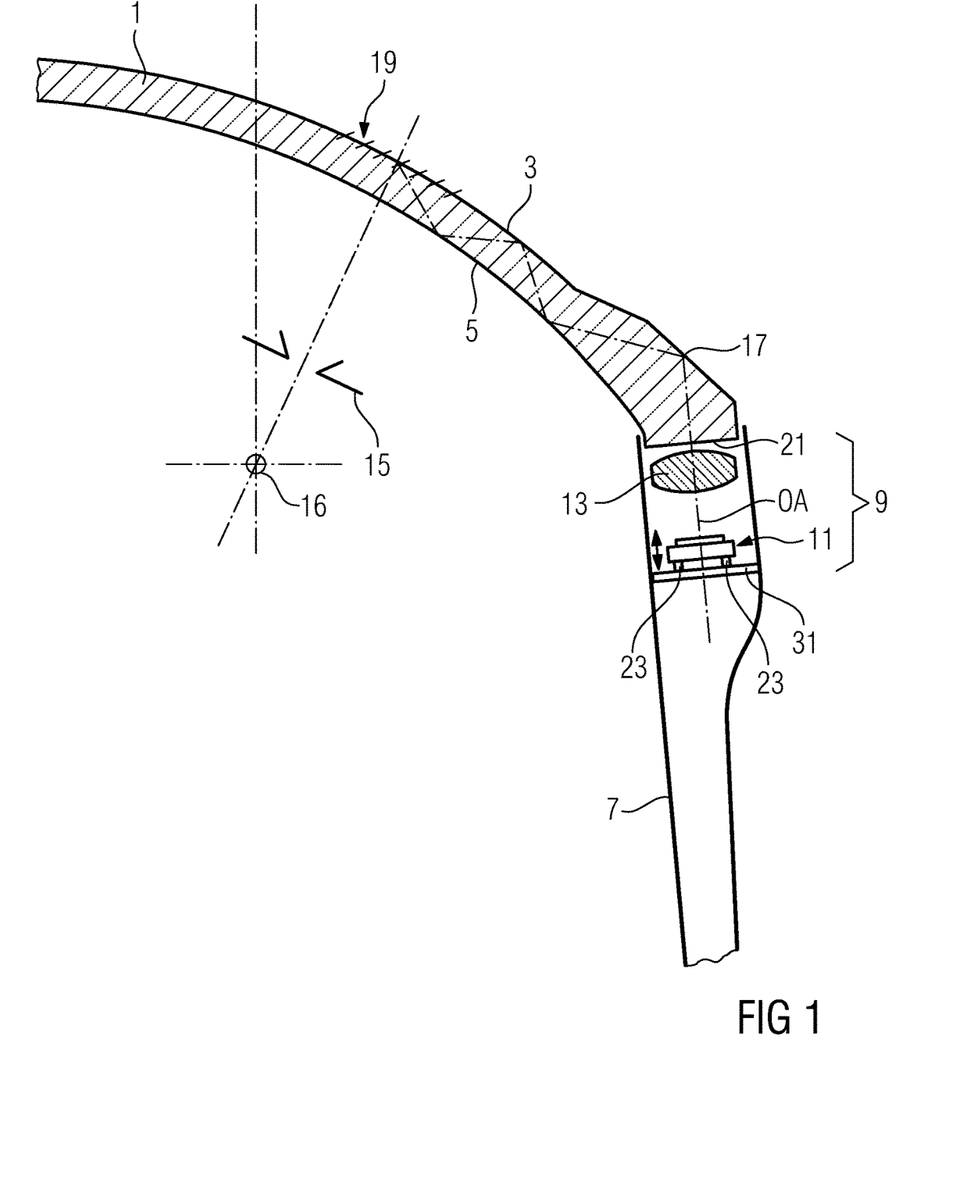
FIG. 1 shows a first exemplary embodiment for data eyeglasses fitted with an imaging device according to the invention in a schematic view.

A first exemplary embodiment for data eyeglasses fitted with an imaging device according to the invention is described below with reference to FIGS. 1 to 5, wherein FIG. 1 shows the data eyeglasses themselves in a schematic representation. FIGS. 2 to 5 show the image generator of the first exemplary embodiment for the data eyeglasses in different variants.

The data eyeglasses of the first exemplary embodiment have an imaging device according to the invention that comprises at least one eyeglass lens, which has a front side 3, which when the eyeglasses are donned faces away from the eye of the eyeglasses user, as well as a rear side 5, which faces the eye of the user when the eyeglasses are donned. Further the data eyeglasses comprise a temple arm, into which in the present exemplary embodiment a display device 9 of the imaging device is integrated. This display device 9 comprises an image generator 11 and an imaging optics 13. Although in the present exemplary embodiment the display device 9 is integrated in the temple arm 7, the display device can also be part of an installation element of the imaging device arranged between the temple arm 7 and the eyeglass lens 1.

The imaging optics of the display device is designed so as to produce a virtual image of an output image generated by the image generator with a relatively large magnification, typically with a magnification >100. The optical axis of the corresponding imaging beam path, which optical axis leads from the image generator 11 into the human eye, of which in FIG. 1 the pupil 15 and the eye's center of rotation 16 are displayed, is shown in FIG. 1. Proceeding from the image generator the optical axis is folded, that is, a reflection of the imaging beam path at a prism surface, which in the present exemplary embodiment is already part of the eyeglass lens 1 and is arranged on the front side 3 of the eyeglass lens. On this prism surface 17, a total reflection occurs in the direction of the rear side 5 of the eyeglass lens, from which a total reflection again occurs in the direction of the front side 3 of the eyeglass lens. After a number of total reflections, the imaging beam path strikes the outcoupling surface 19, from which the imaging beam path is outcoupled in the direction of the eye of the data eyeglasses user. In the present exemplary embodiment, the beam guidance occurs in particular through total reflection events. Alternatively there is also a possibility that it occurs partially or completely through reflection events on reflective or partially reflective layers.

Although the prism surface 17 in the present exemplary embodiment is part of the eyeglass lens 1, it can also be part of a prism separate from the eyeglass lens 1.

The incoupling of the bundle of rays of the imaging beam path proceeding from the image generator 11 into the eyeglass lens takes place in the present exemplary embodiment via the eyeglass lens 1 edge surface 21, which is situated on the side of the eyeglass lens 1 and preferably runs perpendicularly to the optical axis OA of the imaging optics 13 so as to avoid refraction and reflection as much as possible. So as to be able to vary the image distance of the virtual image generated by the imaging optics 13, in the variant shown in FIG. 1 of the first exemplary embodiment, four piezotranslators are assigned to the image generator 11, with which the image generator can be displaced along the optical axis of the imaging optics. The image generator 11 with the piezotranslators 23 is shown in FIGS. 2 and 3 in different views.

Figure 2:
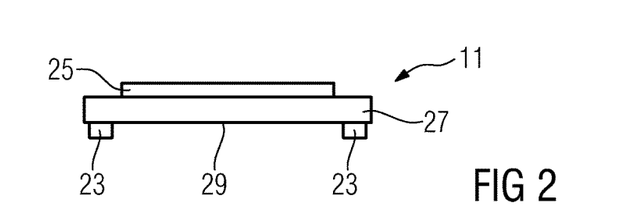
FIG. 2 shows the image generator of the imaging device of the data eyeglasses from FIG. 1.
Figure 3:
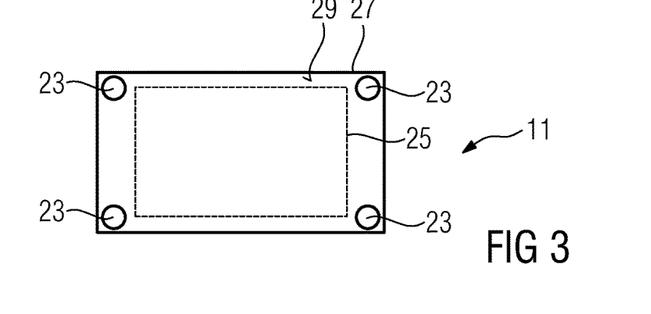
FIG. 3 shows a first variant of the image generator of the first exemplary embodiment in a view of the rear side of the image generator.

The image generator 11, which is shown in FIG. 2 in a side view, comprises a flat display 25, which has a rectangular form in the present exemplary embodiment. The display 25, which can be designed as a liquid crystal display (LCD-display), as a display made from organic light-emitting diodes (OLED-display), etc., is arranged on a carrier plate 27. On the side 29 of the carrier plate 27 facing away from the display 25, which below shall be called the rear side of the carrier plate 27, piezotranslators 23 are arranged. They are located at the corners or close to the corners of the carrier plate 27, as may be seen in particular in FIG. 3, which shows the image generator 11 in a view of the rear side of the carrier plate 27. In this figure, the position of the display 25 is indicated by broken lines.

As can be seen in FIG. 1, there is a support element 31 in the temple arm 7, which likewise is connected to the piezotranslators. This support element 31 can have passages for electric lines, by which the image generator 11 is supplied, but which are not shown in the figure for the sake of clearness. By means of the piezotranslators 23, the position of the image generator 11 can be varied relative to the support element 31 fixedly arranged in the temple arm 7, so that the position of the image generator along the optical axis OA of the imaging optics 13 can be displaced relative to the imaging optics 13. Already a very slight displacement of the image generator 11 along the optical axis OA suffices to cause a significant change of the imaging device. For example, for imaging optics with a focal length of 24 mm, a displacement path of the image generator 11 of 1 mm is sufficient to cause a change in the image position of 3000 mm. By means of precise control of the piezotranslators, therefore, the imaging device and thus the distance of the virtual image perceived by the user of the data eyeglasses can be varied and adjusted over a significant range.

If the piezotranslators 23 in addition can be individually controlled, there is also the possibility of tipping the image generator 11 relative to the optical axis OA of the imaging optics 13. This function makes it possible to equalize the tolerances in the orientation of the image generator 11, which can occur during the manufacturing process, so that this additional function is of importance with respect to ensuring the best possible image quality.

Figure 4:
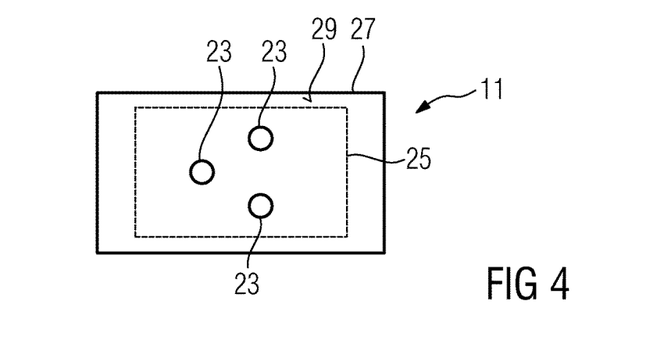
FIG. 4 shows a second variant of the image generator of the first exemplary embodiment in a view of the rear side of the image generator.

A second variant of the image generator, as can be used in the first exemplary embodiment, is represented in FIG. 4 in a view of the rear side 29 of the image generator 11. As can be seen, the piezotranslators 23 in the variant shown in FIG. 4 are not arranged at the corners of the carrier plate 27, but at the center of the carrier plate 27. In addition, instead of four piezotranslators 23 there are only three piezotranslators present, which are arranged at the corners of a notional triangle. An equilateral triangle offers advantage in the control of the piezotranslators, as they are arranged in a fully symmetrical arrangement. By means of three piezotranslators 23 of the second embodiment variant of the first exemplary embodiment, as with the four piezotranslators of the first exemplary embodiment, it is possible to vary the position of the image generator 11 along the optical axis OA of the imaging optics 13, and to tip the image generator 11 with respect to the optical axis OA of the imaging optics 13. Since only three piezotranslators 23 are necessary, this variant is more economical to produce.

Figure 5:
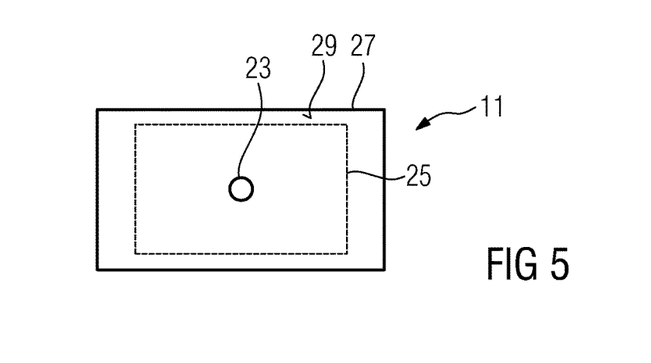
FIG. 5 shows a third variant of the image generator of the first exemplary embodiment in a view of the rear side of the image generator.

An especially simple variant of the first exemplary embodiment is shown in FIG. 5. In this third variant of the first exemplary embodiment, on the rear side 29 of the image generator 11 only a single piezotranslator 23 is arranged. This is situated at the center of the rear side 29 of the carrier plate and permits only displacement of the image generator along the optical axis OA of the imaging optics 23. Tipping of the image generator 11 in this embodiment variant is not possible. This exemplary embodiment is especially suitable when during the production process, the orientation of the image generator 11 with respect to the optical axis OA of the imaging optics 13 is very precise, so that equalization of tolerances in orientation can be dispensed with.

Even though in the first exemplary embodiment, piezotranslators are described as actuators for displacing and/or tipping the image generator 11, other actuators, in particular other piezoelectric actors, but also mechanical actors can be used.

A second exemplary embodiment for data eyeglasses with an imaging device according to the invention is described below with reference to the FIGS. 6 to 9. While FIG. 6 shows a schematic representation of data eyeglasses fitted with the imaging device according to the second exemplary embodiment of the invention, FIGS. 7 to 9 show a wavefront manipulator as can be used in the second exemplary embodiment of the invention as a device for adjusting the image distance of the virtual image.

As the imaging device of the first exemplary embodiment, the imaging device of the second exemplary embodiment shows an eyeglass lens 1 with a front side 3 facing away from the eye of the observer when the eyeglasses are donned, and a rear side 5 facing the eye of the observer. In contrast to the imaging device of the first exemplary embodiment, the prism surface 17 reflecting the imaging beam path proceeding from the image generator 41, however, it is not integrated in the eyeglass lens 1, but is a surface of a prism 18 that in the present exemplary embodiment is a part of the display device 42. The display device 42 arranged in the first exemplary embodiment in the temple arm differs also from the display device 9 of the first exemplary embodiment in that the image generator 41 is fixedly arranged, that is, it cannot be displaced along the optical axis of the imaging optics 13. Instead of at least one actuator 23 connected to the image generator, the imaging device of the second exemplary embodiment has a wavefront manipulator 33 as a device for adjusting the image distance. This is arranged between an outlet surface 35 of the prism 18 and a lateral edge surface 37 of the eyeglass lens 1 connecting the front side 3 and the rear side 5 of the eyeglass lens 1 to one another. Both the outlet surface 35 of the prism and the edge surface 37 of the eyeglass lens 1 are hereby oriented such that the imaging ray bundle proceeding from the image generator 41 parallel to the surface normal strikes the respective surface so that no refraction occurs at the corresponding surface. Likewise the inlet surface 39 of the prism 18 is oriented such that the imaging ray bundle proceeding from the image generator 41 parallel to the surface normal strikes the inlet surface 39 of the prism 18. For the rest, the imaging device and the data eyeglasses of the second exemplary embodiment do not differ from those of the first exemplary embodiment.

In the present exemplary embodiment, the wavefront manipulator comprises a first optical component 43 and a second optical component 45, which are arranged along the optical axis of the imaging optics one behind the other, and which are movable relative to one another in a direction of motion perpendicular to the optical axis. The first optical component 43 and the second optical component 45 each have at least one freeform surface 47, 49, wherein the freeform surface 47 of the first optical component 43 below is called the first freeform surface and the freeform surface 49 of the second optical component 45 is called the second freeform surface. The first freeform surface 47 and the second freeform surface 49 are designed such that they are complementary to one another in a neutral position of the wavefront manipulator 33, that is, in the neutral position, the second freeform surface 49, where the first freeform surface 47 projects in the direction of the optical axis by a specific amount over a notional mid-plane of the freeform surface, has a recess that corresponds to the recess of the first freeform surface 47 in terms of amount. The other surfaces of the two optical components 43 and 45 are plan surfaces, so that the wavefront manipulator 33 in the neutral position essentially corresponds to an optical neutral element, which does not influence the focal length of the imaging optics.

Figure 6:
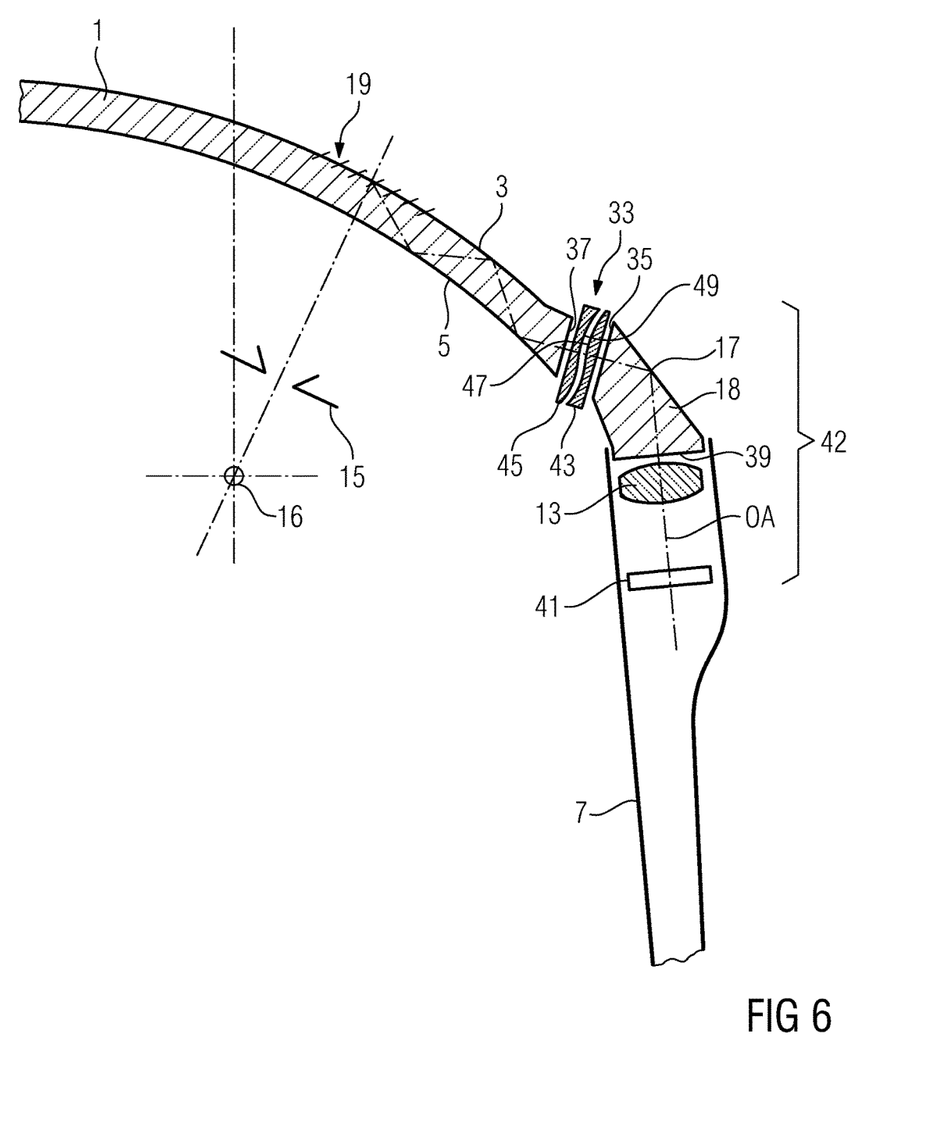
FIG. 6 shows a second exemplary embodiment for data eyeglasses fitted with an imaging device according to the invention in a schematic view.
Figure 7:
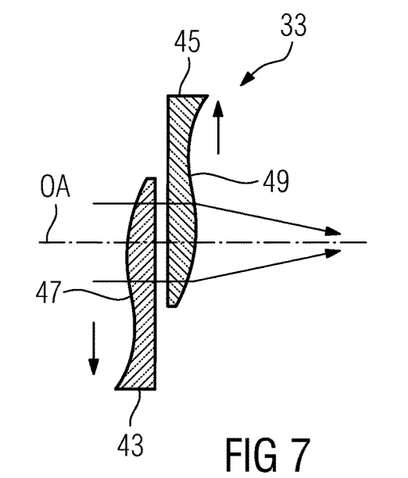
FIGS. 7 to 9 show a wavefront manipulator as it can be used in the second exemplary embodiment, in various positions.
Figure 8:
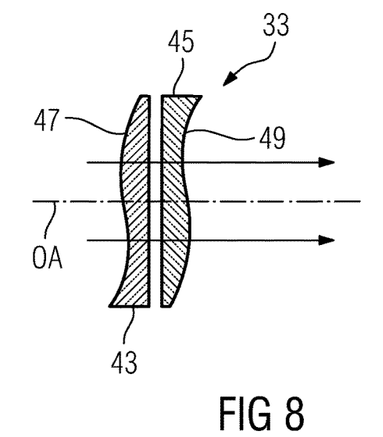
Figure 9:
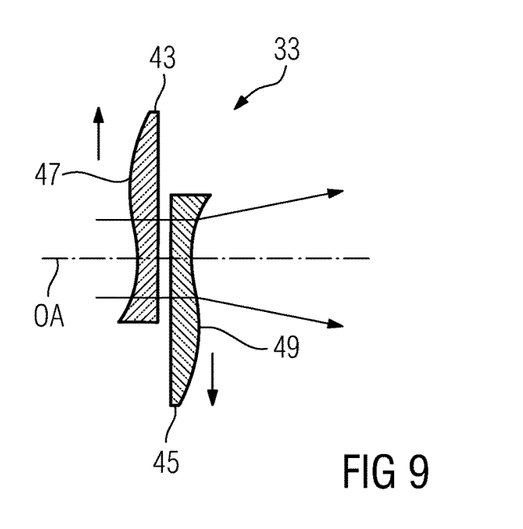

The freeform surfaces of the optical components 43 and 45 can face one another, as shown in FIG. 6, or as is shown in FIGS. 7 to 9, can face away from one another. Whether the freeform surfaces face one another or face away from one another has no influence on the effect of the freeform elements. However, freeform surfaces facing away from one another permit easier illustration of the effect of the optical component in the different positions relative to one another. In the case of freeform surfaces facing away from one another, the freeform elements in addition press closer together as in a displacement perpendicular to the optical axis, no projections can come in contact with one another.

The shape of the freeform surfaces 47 and 49 is selected such that with an opposing displacement of the optical components 43 and 45 perpendicular to the optical axis OA, the focal length of the imaging optics 13 is varied. In a neutral position (FIG. 8), the wavefront manipulator 33 acts neither in a collecting nor in a scattering manner, while on the other hand with a first opposing displacement of the optical component 43, 45 perpendicular to the optical axis OA it acts in a collecting manner (FIG. 7), and with a second opposing displacement (FIG. 9), the reverse of the first, of the optical components 43, 45 perpendicular to the optical axis OA, it acts in a scattering manner. As can be taken from FIG. 8, the wavefront manipulator in the neutral position has the same thickness everywhere along the optical axis, wherein a collecting refraction at the one freeform surface is again eliminated by a scattering refraction at the other freeform surface, so that the wavefront manipulator in the neutral position in the region penetrated by the bundle of rays acts in neither a collecting nor a scattering manner. In the configuration of the wavefront manipulator 33 shown in FIG. 7, in which the optical components 43 and 45 are displaced in the first opposing displacement with respect to one another, the optical components 43, 45 in the region penetrated by the bundle of rays form a positive lens, and thus act in a collecting manner. In the configuration of the wavefront manipulator 33 shown in FIG. 9, in which the optical components 43 and 45 in the second opposing displacement, the reverse of the first, are displaced with respect to one another, the region of the wavefront manipulator 33 penetrated by the bundle of rays forms a negative lens, so that the wavefront manipulator 33 in this configuration acts in a scattering manner.

While the wavefront manipulator in the neutral position shown in FIG. 8 does not change the focal length of the imaging optics 13, in the configuration of the wavefront manipulator 33 shown in FIG. 7, it reduces the focal length. On the other hand, in the configuration of the wavefront manipulator 33 shown in FIG. 9 it increases the focal length of the imaging optics 13. The wavefront manipulator 33 can therefore be viewed as a vario lens with variable focal length. When there is a reduction of the focal length of the imaging optics 13, the image distance of the virtual image decreases; when there is an increase in the focal length of the imaging optics, the image distance of the virtual image increases. Through continuous opposing displacement of the optical components 43, 45 perpendicular to the optical axis, continuous adjustment of the focal length between a minimal and a maximal focal length can take place, and thus a continuous adjustment of the image distance between a minimal image distance and a maximal image distance. Such vario lenses are known under the term Alvarez lenses, which are described in U.S. Pat. No. 3,305,294. Reference is therefore made to this document as regards further properties of the Alvarez lens.

In the second exemplary embodiment, the wavefront manipulator 33 serves first of all to bring about a defocus, and in this way to vary the focal length of the imaging optics by manipulation of the wavefront of the ray bundle. The wavefront of a ray bundle is given by the points of the electromagnetic wave that have the same phase. Mathematically the wavefront can be represented by superposition of functions of a complete function system. Typically Zernike polynomials are used as function systems, wherein the individual Zernike polynomials represent different image errors (a defocus is to be understood in this representation as an image error). In the representation of the wavefront, herein a Zernike coefficient is assigned to each Zernike polynomial, wherein the wavefront is described by Zernike coefficients. The freeform surfaces 47, 49 of the optical components 43, 45 of the wavefront manipulator 33 can be selected such that they generate a manipulation of the wavefront, which can be described by a Zernike polynomial. The associated Zernike coefficient is determined by the contribution of the relative displacement of the two optical components 43, 45. A mathematical equivalent description may also be achieved by an expansion according to other complete function systems, for example through a Taylor expansion. Below the basic principles for constructing the freeform profiles are presented with reference to a Taylor expansion.

The freeform surface with explicit surface representation can be described in the form z(x,y) by a polynomial, which in a coordinate x perpendicular to the direction of motion of the optical components 43, 45 has only even powers of x, and in a coordinate y parallel to the direction of motion only odd powers of y. The freeform surface z(x,y) can first be generally described for example by a polynomial expansion of the form $$z = \sum_{m,n=0}^{\infty} C_{m,n} x^m y^n \tag{1}$$

wherein $C_{m,n}$ represent the expansion coefficients of the polynomial expansion of the freeform surface in the degree m with respect to the x-axis and the degree n with respect to the y-axis. Hereby x, y, and z designate the three Cartesian coordinates of a point lying on the surface in the local surface-related coordinate system. The coordinates x and y are hereby to be inserted in the formula as dimensionless quantities in so-called lens units. Lens units here mean that all lengths are initially given as dimensionless quantities and later are interpreted such that they are multiplied uniformly by the same mass unit (nm, µm, mm, m). The background is that the geometric optics is scale-invariant, and in contrast to wave optics, does not have a natural length unit.

A pure defocusing effect can be brought about according to the teaching of Alvarez when the freeform surface of the optical components 43, 45 can be described by the following 3rd-order polynomial:

$$z(x, y) = K \cdot \left( x^2 \cdot y + \frac{y^3}{3} \right) \tag{2}$$

It is hereby assumed that the lateral displacement of the optical components 43, 45 occurs along the y-axis, which is thereby defined. If the displacement is to take place along the x-axis, in the above equation the roles of x and y are to be exchanged accordingly. The parameter K scales the profile depth so to speak and in this manner determines the attainable refraction change per unit of lateral displacement path s.

For ray bundles falling parallel to the optical axis OA and air (refractive index n=1) between the two optical components 43, 45, the lateral displacement of the optical components is effected by a length s=|±y|, thus a change in the wavefront according to the equation $$\Delta W(x, y) = K \cdot \left(2 \cdot s \cdot (x^2 + y^2) + 2 \cdot \frac{s^3}{3}\right) \quad (3)$$

thus a change in the focus length by a change of the parabolic wave front portion plus a so-called piston-term (Zernike polynomial with j=1, n=0, and m=0), where the latter corresponds to a constant phase, and does not act on the imaging properties precisely when the optical element according to the invention is in the infinite beam path, that is in the region of a collimated ray bundle. Otherwise the piston-term for imaging properties can usually be ignored.

The surface refractive power of such a wavefront manipulator functioning as a vario lens is given by the following formula:

$$\Phi_v = 4 \cdot K \cdot s \cdot (n-1) \quad (4)$$

Here, s is the lateral displacement path of an element along the y-direction, K is the scaling factor of the profile depth, and n is the refractive index of the material from which the lens is made for the respective wavelength.

It is possible that the two optical components 43, 45 moved relative to one another as shown in FIG. 6 are oriented such that the two freeform surfaces 47, 49 face one another. In this case, it is especially simple to carry out a calibration of the neutral position, namely by reducing the separation between the two optical components 43, 45 until the two components touch. In this position, there is automatic centering of the optical components. Subsequently the separation in the axial direction can again be enlarged until the two optical components 43, 45 are not touching during lateral movement during operation according to function. Alternatively, it is in principle also possible to orient the two optical components 43, 45 in such a way that the freeform surfaces 47, 49 face away from one another, as is shown in FIGS. 7 to 9.

It is also possible that the freeform surfaces can have additional higher-order terms so as to influence individual image errors. For example, a 5th-order polynomial of the form:

$$z(x, y) = K \cdot \left(y \cdot x^4 + \frac{2}{3} \cdot (x^2 \cdot y^3) + \frac{y^5}{5}\right) \quad (5)$$

would largely influence the primary spherical aberration. In this manner a partial or complete equalization of the spherical aberration induced by the thickness change of the element (piston-term) in the convergent beam path can be carried out. A 5th-order spherical aberration is described by a corresponding 7th-order polynomial etc.

The structural profiles can be freely overlain, that is, a structure for changing the refractive power and a structure for changing the spherical aberration can be overlain in a freeform surface 47, 49, so that a corresponding wavefront manipulator upon displacement of the optical components 43, 45 toward one another varies a refractive effect and at the same time changes a spherical aberration, wherein both changes are proportional to one another with a proportionality factor that must be optionally but firmly preselected.

Furthermore, it is also possible that both sides of the moved optical components 43, 45 have an effective form according to the above-described forms. For example, a symmetrical division of the surface profile according to the above formulas into a front and rear surface of a component causes the profile depths on each surface to remain adequately small, so that for example a photolithographic production of the element, which typically allows only maximal profile depths in the region of <10-30 µm, is facilitated. Apart from the easier production, smaller profile depths basically also offer the advantage that they cause fewer undesired image errors in comparison with the greater profile depths. Undesired image errors arise on the profiles of the optical components of a freeform element based on the finite separation between the optical components, with the result that a ray that is refracted on the freeform surface of the first optical component at a specific separation from the optical axis does not exactly strike the second freeform surface at the corresponding point, but is somewhat displaced. The resultant errors drastically increase (superlinearly) with the profile depth, because greater profile depths not only possess greater refractive effect, but also demand a greater separation between the elements. Splitting of the freeform profiles into a front and rear side of the freeform element is therefore always advantageous from the optical standpoint, although also more costly to produce.

According to Lohmann (cf. Appl. Opt. Vol. 9, No. 7, (1970), p. 1669-1671) it is possible to provide a vario lens largely equivalent to a teaching of Alvarez, for which the two freeform surfaces for example are described in the minimal order by an equation of the form $$z(x,y) = A \cdot (x^3 + y^3) \quad (6)$$

and the relative motion of the optical components 43, 45 with respect to one another occurs along a line of less than 45° with respect to the x- and y-axis running perpendicularly to the optical system axis. The constant A is hereby again a free scaling constant, that describes the maximal profile depth of the freeform surface and thus the refractive power change per path length. In Lohmann's description this is not an independent solution, but essentially only an alternative representation.

Further details regarding construction of freeform surfaces with which the variable refractive effect can be achieved are described in U.S. Pat. No. 3,305,294. Reference is made to this document with regard to construction of freeform surfaces.

A specific exemplary embodiment for a vario lens, as can be used in the imaging device according to the invention, has the following coefficients differing from zero for the polynomials of the polynomial expansion from equation (1):
Coefficient of $x^2y^1$: −0.00034202
Coefficient of $x^0y^3$: −0.00011501
Coefficient of $x^4y^1$: 2.96838e-007
Coefficient of $x^2y^3$: 4.11918e-007
Coefficient of $x^0y^5$: 1.58179e-007
Coefficient of $x^6y^1$: 2.64705e-009
Coefficient of $x^4y^3$: −6.14040e-009
Coefficient of $x^2y^5$: −2.99993e-009
Coefficient of $x^0y^7$: −2.06008e-009

Coefficients of all other polynomials are equal to zero in this specific exemplary embodiment.

Freeform surfaces with the above-described polynomial coefficients show a course of the z-component of the freeform surface in which the z-component lines with ±30 µm referred to a middle flat plane surface of the respective optical component. This shows that the optical components 43, 45 need differ only slightly from a plan-parallel plate.

With the above-described coefficient, the imaging device of the virtual image with imaging optics with 24-mm focal length in the neutral position of the optical components 43, 45 is equal to 2000 mm, in a collecting configuration of the optical components 43, 45 is equal to 500 mm, and in a scattering configuration of the optical components 43, 45 is equal to 3500 mm. In this regard a maximal lift of the optical components 43, 45 of around 2.4 mm is necessary.

As is already plain from FIGS. 6 to 9, the freeform surfaces of the two optical components 43, 45 can be arranged either facing one another or facing away from one another on the respective optical components. However it is possible to provide both sides of the optical components with freeform surfaces. The two freeform surfaces of an optical component are then configured such that they jointly have the intended effect. In this way the deviation of a freeform surface from a middle flat surface is further reduced.

Instead of the wavefront manipulators described with regard to FIGS. 6 to 9, with two optical components that each have at least one freeform surface, different wavefront manipulators can also be used. Also conceivable here for example are adaptive mirrors of liquid lenses that permit the refractive power of the lens to be varied by applying an electrical voltage. It is important in choosing a suitable wavefront manipulator only that the focal length of the imaging optics may be varied with it.

For purposes of explanation, the present invention was described with reference to exemplary embodiments. As was already presented, however, in the scope of the exemplary embodiments, differences from the described exemplary embodiments are possible. Basically there is also the possibility of combining features of the individual exemplary embodiments with one another. Thus, for example, it is conceivable to design the image generator of the second exemplary embodiment as in the first exemplary embodiment, displaceable or tippable by means of one or more actors. The invention should therefore not be limited to feature combinations of the exemplary embodiments, but only by the enclosed claims.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

The invention claimed is:

1. An imaging device for displaying a virtual image, comprising:
   at least one eyeglass lens to be worn in front of the eye lens;
   a display device arranged on the edge region of the eyeglass lens, comprising:
      an image generator for displaying an outlet image; and
      imaging optics arranged between the image generator and the eyeglass lens for producing the virtual image from the output image,
   wherein the image generator defines the start point of an imaging beam path producing the virtual image with an image distance from the output image,
   wherein the imaging beam path undergoes incoupling into the eyeglass lens due to the imaging optics via the edge region; and
   an outcoupling device present in the eyeglass lens for outcoupling of the imaging beam path in the direction of the eye,
   wherein the display device comprises a device for adjusting the imaging device of the virtual image, the display device for adjusting the imaging device of the virtual image including at least three actuators connected to the image generator for effecting displacement of the image generator, each of the at least three actuators arranged at the corners of a notional triangle, and each of the at least three actuators connected to the image generator.

2. The imaging device according to claim 1 in which at least the at last one actuator is a mechanical or electromechanical actuator.

3. The imaging device according to one of claim 1, further comprising a device for tipping of the image generator.

4. The imaging device according to claim 3, in which the image generator comprises a rectangular image generator, and at least one actuator is disposed on each corner of the rectangular image generator.

5. The imaging device according to one of claim 1, in which the display device as the device for adjusting the image distance comprises at least one wavefront manipulator arranged between the image generator and the edge region of the eyeglass lens for manipulating the focal length of the imaging optics.

6. The imaging device according to claim 5, in which the wavefront manipulator comprises a first optical component with at least one first freeform surface and at least one second optical component with at least one second freeform surface, wherein the first optical component and the second optical component are arranged along the optical axis of the imaging beam path behind one another and are movably arranged with respect to one another in a direction of motion perpendicular to the optical axis.

7. The imaging device according to claim 6, in which the freeform surfaces are defined in a Cartesian coordinate system with an x-axis, a y-axis, and a z-axis, wherein the z-axis represents the optical axis of the imaging beam path and the z-coordinates of a freeform surface depending on the x- and y-coordinates are described by a polynomial expansion in the form $$z = \sum_{m,n=0}^{\infty} C_{m,n} x^m y^n$$

wherein $C_{m,n}$ represents the expansion coefficients of the polynomial expansion of the freeform surface in the order m with respect to the x-coordinate and the order n with respect to the y-coordinate.

8. The imaging device according to claim 7, in which the direction of motion runs parallel to the y-axis and only polynomials with odd order n and even order m have expansion coefficients different from zero.

9. The imaging device according to claim 8, in which at least the expansion coefficients of the polynomials $x^2y$ and $y^3$ are different from zero.

10. The imaging device according to claim 9, in which additionally at least the expansion coefficients of the polynomials $x^4y$, $x^2y^3$ and $y^5$ are different from zero.

11. The imaging device according to claim 10, in which additionally at least the expansion coefficients of the polynomials $x^6y$, $x^4y^3$, $x^2y^5$ and $y^7$ are different from zero.

12. The imaging device according to claim 7, in which the values of the z-coordinates differ by no more than ±0.1 mm from a median value of the z-coordinate.

13. The imaging device according to claim 7, in which the values of the z-coordinates differ by no more than ±50 µm from a median value of the z-coordinate.

14. The imaging device according to claim 7, in which the values of the z-coordinates differ by no more than ±30 µm from a median value of the z-coordinate.

15. The imaging device according to one of claim 6, in which the values of the maximal displacement of the first optical component and the second optical component are each no more than 5 mm.

16. Data eyeglasses, comprising:
an imaging device according to claim 1.

17. An imaging device for displaying a virtual image, comprising:
at least one eyeglass lens to be worn in front of the eye lens;
a display device arranged on the edge region of the eyeglass lens, comprising:
an image generator for displaying an outlet image; and
imaging optics arranged between the image generator and the eyeglass lens for producing the virtual image from the output image
wherein the image generator defines the start point of an imaging beam path producing the virtual image with an image distance from the output image,
wherein the imaging beam path undergoes incoupling into the eyeglass lens due to the imaging optics via the edge region; and
an outcoupling device present in the eyeglass lens for outcoupling of the imaging beam path in the direction of the eye,
wherein the display device comprises a device for adjusting the imaging device of the virtual image, the display device for adjusting the imaging device of the virtual image including at least one actuator connected to the image generator for effecting displacement of the image generator,
wherein the image generator comprises a rectangular image generator, and
wherein an actuator is disposed on each corner of the rectangular image generator.

18. An imaging device for displaying a virtual image, comprising:
at least one eyeglass lens to be worn in front of the eye lens;
a display device arranged on the edge region of the eyeglass lens, comprising:
an image generator for displaying an outlet image; and
imaging optics arranged between the image generator and the eyeglass lens for producing the virtual image from the output image
wherein the image generator defines the start point of an imaging beam path producing the virtual image with an image distance from the output image,
wherein the imaging beam path undergoes incoupling into the eyeglass lens due to the imaging optics via the edge region; and
an outcoupling device present in the eyeglass lens for outcoupling of the imaging beam path in the direction of the eye,
wherein the display device comprises a device for adjusting the imaging device of the virtual image,
wherein the display device as the device for adjusting the image distance comprises at least one wavefront manipulator arranged between the image generator and the edge region of the eyeglass lens for manipulating the focal length of the imaging optics,
wherein the wavefront manipulator comprises a first optical component with at least one first freeform surface and at least one second optical component with at least one second freeform surface, wherein the first optical component and the second optical component are arranged along the optical axis of the imaging beam path behind one another and are movably arranged with respect to one another in a direction of motion perpendicular to the optical axis,
wherein the freeform surfaces are defined in a Cartesian coordinate system with an x-axis, a y-axis, and a z-axis, wherein the z-axis represents the optical axis of the imaging beam path and the z-coordinates of a freeform surface depending on the x- and y-coordinates are described by a polynomial expansion in the form $$z = \sum_{m,n=0}^{\infty} C_{m,n} x^m y^n$$

wherein $C_{m,n}$ represents the expansion coefficients of the polynomial expansion of the freeform surface in the order m with respect to the x-coordinate and the order n with respect to the y-coordinate,
wherein the direction of motion runs parallel to the y-axis and only polynomials with odd order n and even order m have expansion coefficients different from zero, and
wherein at least the expansion coefficients of the polynomials $x^2y$ and $y^3$ are different from zero.

* * * * *